Patented June 19, 1945

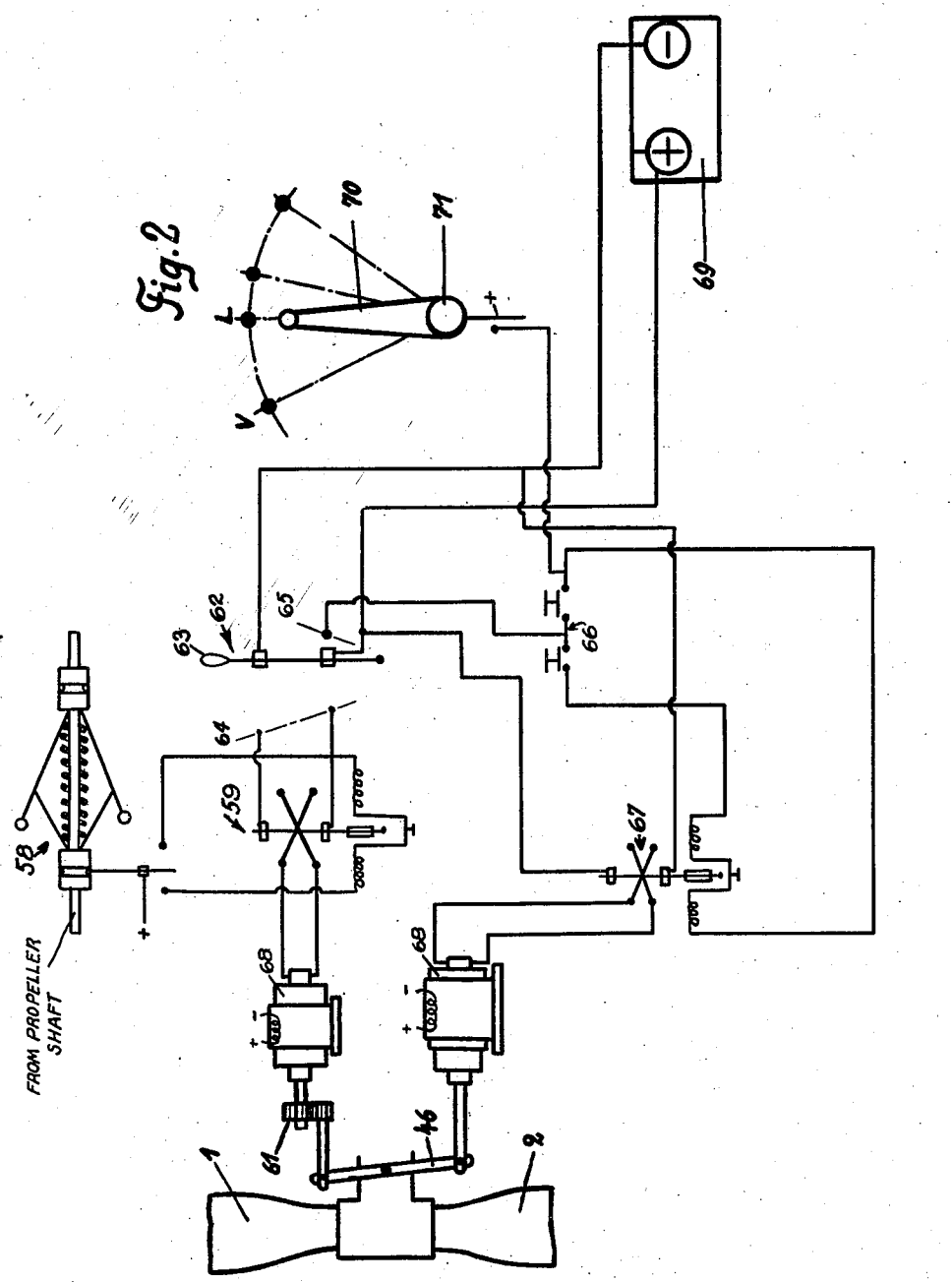

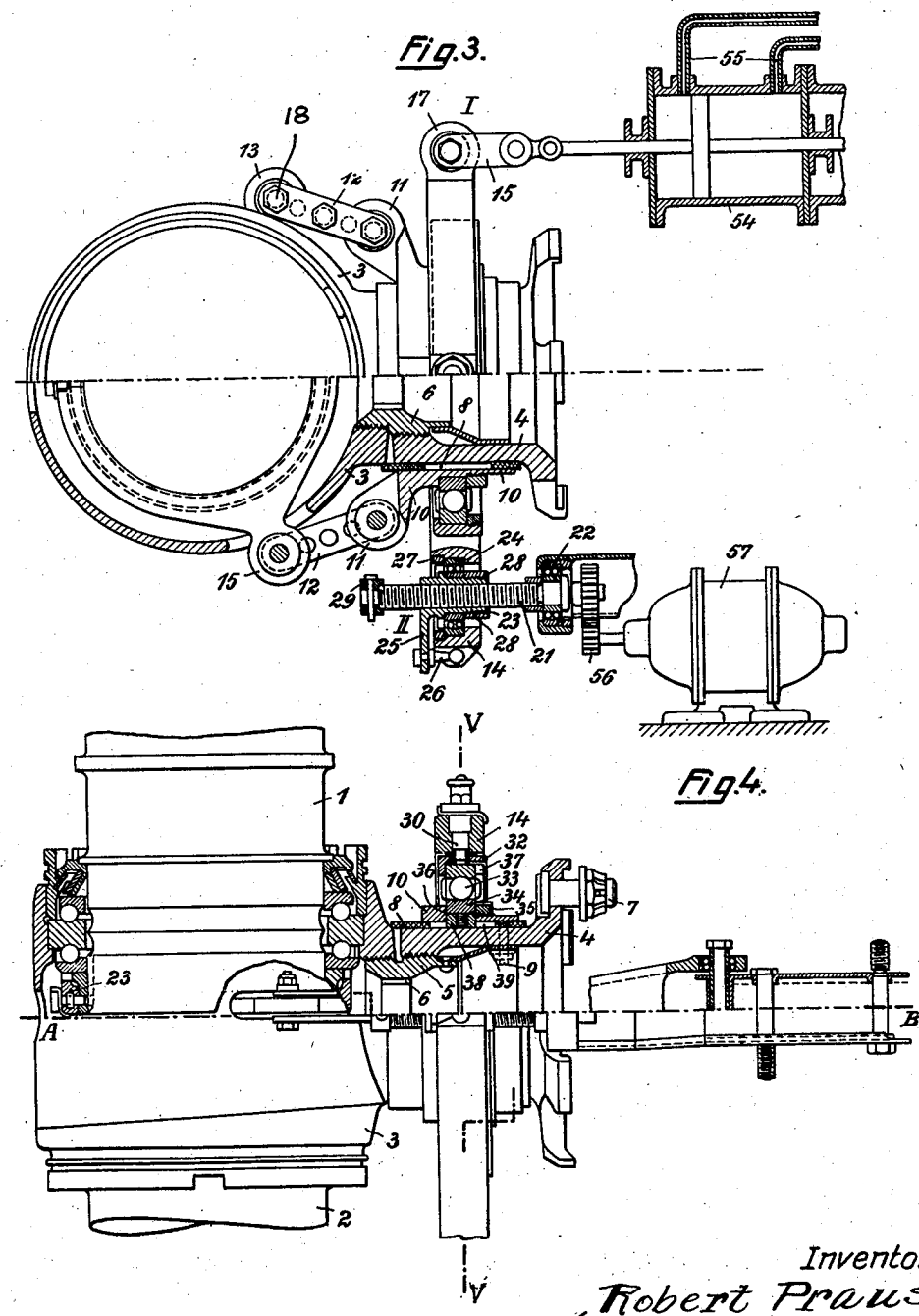

2,378,580

UNITED STATES PATENT OFFICE 2,378,580

AIR PROPELLER DRIVING SYSTEM

Robert Prause and Lukas Schmid, Augsburg, Germany; vested in the Alien Property Custodian Application October 22, 1940, Serial No. 362,280
In Germany June 10, 1938

7 Claims. (Cl. 170—163)

The present invention relates to improvements in variable pitch propellers for aircraft, and more particularly to propellers which are controlled by an automatic speed regulator during normal flight and which are further controlled by a manual control lever to obtain feathering or braking positions.

Heretofore, adjusting systems for variable pitch propellers included only one source of mechanical power such as a hydraulic cylinder, an electric motor, or the propeller driving motor itself. As it is necessary to obtain sensitive pitch control during normal flight, such a single source of mechanical power must be adapted to operate at a low adjusting speed. This involves considerable delay particularly when changing the pitch from a coarse pitch to braking position or from braking position to climbing position.

It is therefore an important object of the present invention to provide an adjusting system for variable pitch propellers which, although sensitive in cooperation with the automatic speed regulator, permits of a rapid adjustment to feathering or braking positions or to normal flight positions.

Another object of the present invention is to provide a strong and reliable adjusting system for variable pitch propellers.

With these and other objects in view, as may become apparent from the following, the invention consists not only in the structures herein described and illustrated in the drawings, but includes further structures coming within the scope of the claims.

The character of the invention will be understood by reference to the accompanying drawings in which—

Fig. 2 is a diagrammatic view of the complete plant including the control members.

Fig. 3 is a plan view, partly in a substantially horizontal cross section, of an adjusting device in which the sleeve setting lever is connected by a Cardan arrangement with the members linked to its ends.

Fig. 4 is a side elevation, partly in a vertical section, of the arrangement shown in Fig. 3.

Figure 1:
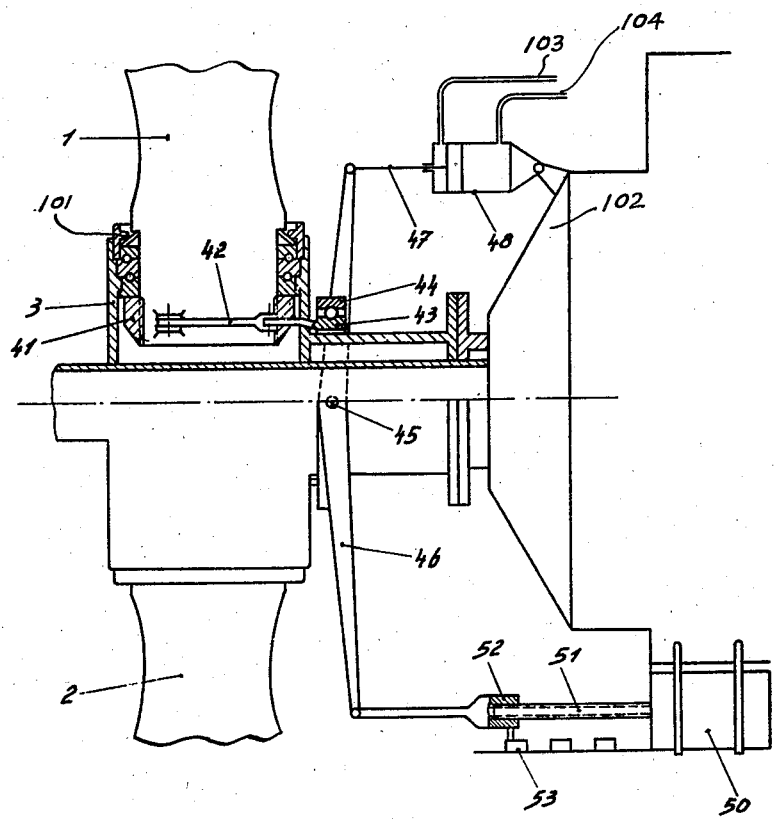
Fig. 1 is a schematical view of a propeller adjusting device embodying the invention.

As here shown, we provide two separately acting sources of mechanical power for the adjustment of the propeller blades. Each of these sources of mechanical power is adapted to act in either direction of adjustment. One of the sources of mechanical power is operative only in connection with the automatic speed regulator and in the range of pitches used during normal flight. The adjustment provided by this power source takes place at a low speed at this range of pitch is comparatively small and requires sensitiveness more than speed in the adjustment. Low adjustment speed involves smaller forces for controlling this source of mechanical power, and with a given adjusting force of the automatic speed regulator, a greater sensitiveness. The force required for controlling this source of mechanical power, including frictional losses, may be reduced below 1% and even to values in the order of 0.15% of the adjusting force of the automatic speed regulator. The smaller this value, known as "degree of insensibility," the smaller a deviation from the normal speed will be sufficient to cause the adjusting system to operate and, by changing the pitch of the propeller blades, to restore the normal speed. The second source of mechanical power is intended for operation only when extreme positions of the propeller blades, such as feathering or braking positions, are desired and for manual control. The high adjusting speed required for this operating range may be attained by suitable means and sensitiveness is unimportant during the high speed adjustment. The adjusting speed of the second source of mechanical power should ordinarily be a multiple of the adjusting speed of the first source of mechanical power controlled by the automatic speed regulator.

Both of the drives may include electric motors, one of which is fitted with a reduction gear of higher ratio, or the slow drive may include hydraulic means.

Preferably the two sources of mechanical power are arranged to act upon the opposite ends of a two-armed lever which surrounds a slidable adjusting sleeve and actuates the same, for turning the propeller blades connected thereto. The adjustment of propeller blades by a sleeve slidable on the propeller shaft is known per se and is herein employed in combination with two independent sources of mechanical power.

By reason of this particular double driving system, and more particularly by the rapid drive, the adjusting mechanism is exposed to high stress. Therefore, in order to avoid premature wear, one or more elements permitting a Cardan-motion are provided between the stationary points of the device, such as the engine casing, or gear casing, and the sleeve sliding on the propeller shaft, thus avoiding jamming action in the mechanism. It has been found that with a suspension of the adjusting device permitting swinging of the two-armed adjusting lever in one plane only, considerable damages may occur on the slidable sleeve, even after a few hours of flight, while these disadvantages can be avoided by the Cardan suspension or gimbal mounting.

As here shown, the gimbal mounting may be effected by connecting both ends of the two-armed adjusting lever by self-aligning ball bearings or by Cardan joints with the driving means engaging it at its opposite ends. By way of alternative, a Cardan joint or gimbal mounting may be provided between the two-armed lever and the sleeve.

According to a further feature of the invention the slidable sleeve may consist of artificial resins on the phenol-aldehyde basis, such as "Bakelite."

Referring now to the drawings in greater detail, and first to Fig. 1, it will be noted that the propeller blades 1 and 2 are mounted to be turnable in ball bearings 101 seated in the hub 3 of the propeller. Interiorly threaded setting levers 41 are fixedly screwed on the bases of the propeller blades and connected through connecting rods 42 to a sleeve 43 constituting the inner ring of a ball bearing whose outer ring 44 is connected to a surrounding two-armed adjusting or setting lever 46, by means of trunnions 45. The upper arm of said setting lever 46 is engaged by the piston rod 47 of a cylinder 48 which is mounted on the motor or gear casing 102 of the airplane and operated by oil under pressure. Also mounted on this casing is an electric motor 50 which by means of any suitable transmission gear operates on the lower arm of the lever 46. In the embodiment illustrated in Fig. 1, the motor shaft 51 itself is constructed as a threaded spindle engaged by a nut member 52 which is operatively connected to the lever 46, whereby the adjusting force is transmitted in a very simple manner.

The supply of oil to the pipes 103 and 104 of the cylinder 48 is under the control of an automatic speed regulating device (not shown) while with the speed regulating device cut off the connecting point of the piston rod 47 with the lever 46 forms a stationary pivot for swing motion of the lever 46 under action of the motor 50.

On the other hand, as the hydraulic mechanism 47, 48 is operating, the electromotive drive 50, 51, 52 is motionless and the link between the lever 46 and the end of the nut 52 acts as a pivot for the lever 46, since the nut 52 is self-locking on the spindle 51. It follows that on operation of the piston in the cylinder 48 the lever 46 is swung about this lower pivot, taking along the sleeve 44.

During control of the propeller blades by the electric motor 50 the same is switched off as the position of the propeller blades desired at the time has been reached. This is achieved by cooperation of the spindle nut 52 with contacts 53 in such a manner that the spindle nut 52 on engagement with one of said contacts closes or opens an electric circuit (not shown). A separate selection switch (not shown) serves to determine the operative contact 53.

Fig. 2 illustrates the general arrangement of the control means for the operation of the adjustable propeller. In this case, electric motors have been provided for both the automatically controlled, slowly acting drive and a manually operated quickly acting drive. The blades 1 and 2 of the adjustable propeller are turned by swinging the lever 46, as in Fig. 1. The upper end of this lever is acted upon by an electric motor 60, through a speed reducing gear 61, making up the slow drive. A centrifugal regulator 58 controls the speed of the motor 60, through a relay 59. To this end, the centrifugal regulator 58 is adjusted to maintain a predetermined propeller speed, which advantageously depends on the position of the gas control lever. As the actual propeller speed falls below this speed or exceeds the same, the centrifugal regulator will readjust the propeller blades accordingly. For instance, if the propeller speed becomes less than the predetermined speed, the regulator 58 through the relay 59 will operate the motor 60 in such a direction that the pitch of the propeller blades is decreased, whereby the driving motor is relieved and the speed may go up again. On the other hand, if the actual propeller speed exceeds the predetermined speed, the regulator will cause an oppositely directed blade adjustment, or an increase of the propeller pitch and increased load for the driving engine of the airplane, whereby the speed is slowed down.

A switch 62 permits selective operation of the automatic or manual adjusting system by engagement of its lever 63 with the contact 64, switching in the automatic system, or the contact 65, switching off the automatic system and switching in the manual adjusting device.

If the manual system has been selected by engagement of lever 63 with contact 65, the system may be operated by a push button switch 66, which in most instances will be combined with, or mounted on, the accelerator and actuates a quick adjustment motor 68, through a relay 67, whereby the propeller blades may be turned into a position for gliding.

The gas lever or accelerator which is indicated at 70, may be set to various positions. V is the open throttle position for normal operation; L is the idle running or no load position. If the lever is swung from the position V beyond position L, the propeller by means of a controller cylinder or drum type switch connected to the lever 70 is automatically set to a braking position which is independent from the position of the lever 63 of switch 62. Suitable means in the form of a link, brake or the like are provided to mark the no load position for the pilot.

The source of current for the propeller adjusting plant is indicated at 69 in the form of a storage battery.

Referring to Fig. 4, the propeller blades are mounted to turn in the propeller hub 3, as in the above mentioned constructions, the hub 3 being coupled with a hollow propeller shaft 4 by toothed end faces 5. An interior threaded member 6 serves for connecting the two parts. On the rear side, the shaft 4 may be constructed corresponding to the shape of the coupling on the motor shaft and it may be connected to the motor shaft by means of bolts 7. A bushing 8 consisting of plastic material and more particularly of an artificial resin material of the phenol-aldehyde type including textile admixtures is mounted on the shaft 4 by means of screws 9. Slidably seated on the bushing 8 is a sleeve 10 having lugs or eyelets 11, Fig. 3, to which connecting rods 12 are jointed which on their opposite ends are jointed to the adjusting levers 13 of the propeller blades. Said levers 13 by means of their female threads are fixedly screwed to the base of their propeller blades, so that the propeller blades 1 and 2 can be turned by swinging the levers 13. The ring-shaped setting lever or traverse 14 engages around the sleeve 10 and is jointed Cardan-fashion, at two opposite points I and II, to members 15 and 21, Fig. 3, establishing the connection with the respective driving mechanisms, 54 and 57.

Figure 5:
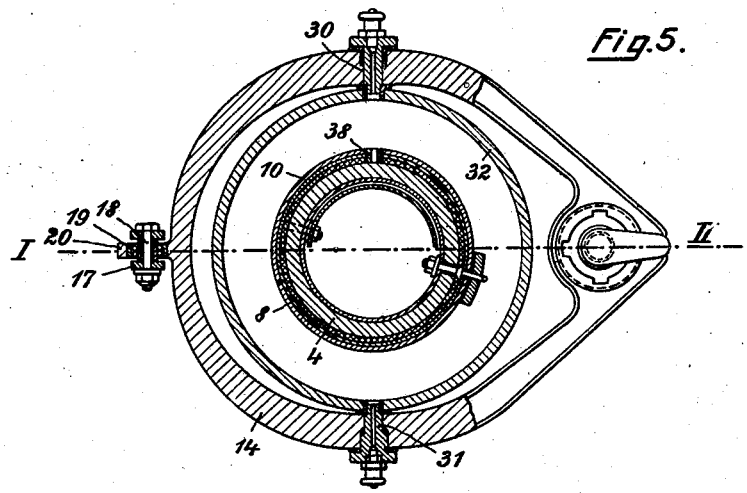
Fig. 5 is a cross section of the adjusting mechanism taken on the line V—V of Fig. 4.

The ring 14 has trunnions 30 and 31, Fig. 5, on which is pivoted an interior holder ring 32 for a ball bearing 33, (Fig. 3) whose inner race ring 34 is seated on the sleeve 10, being forced against the stop face or collar 36 of the sleeve 10 by means of a threaded ring 35 (Fig. 4). A further threaded ring 37 which is screwed into the holder ring 32 serves for securing the outer race ring of the ball bearing in the holder ring. The slidable sleeve 10 is secured against turning on the bushing 8 by means of a key 38 engaging into a slot 39 of the bushing 8 the length of which corresponds to the maximum stroke of the slide motion.

The upper end of the two-armed lever or ring 14 is linked to the piston rod of the cylinder 54 by means of a connecting rod 15, and a trunnion 18 which is supported in self-aligning ball bearing 19 of the lug 20 on the ring 14. It follows that the traverse ring 14 owing to the provision of the ball bearing 19 is swingable with respect to the connecting rod 15 around two axes at right angles to each other.

Referring now to the opposite side of the traverse ring 14, the electric motor 57 (Fig. 3) through a reduction gear 56 drives a threaded spindle 21 which is supported in a self-aligning ball bearing indicated at 22, so as to be swingable while being secured against axial sliding. A nut member 23 on the spindle 21 is supported in the traverse ring 14 by means of a bearing 24 fixedly secured in the traverse ring by a threaded ring 27 and permitting free swing motion of the nut to all sides but preventing slide motion thereof. A threaded ring 28 is fixedly threaded on the nut 23 and serves to prevent the nut from sliding with respect to the traverse ring. A locking and stopping ring 29 is provided on the free end of the spindle 21. The suspension points I and II are displaced by 90° with respect to the trunnions 30 and 31, Fig. 5.

The piston in the cylinder 54, Fig. 3, is moved by feeding or discharging oil under pressure through the pipes 55, under control of an automatic speed governor. During operation of the piston in the cylinder 54 the motor 57 is switched off. The spindle 21 therefore stands still and its nut 23 is stationary with respect to the aircraft. The traverse ring 14 therefore may swing about the pivot II and take along the slidable sleeve 10.

As the plant is switched over to control by the motor 57, the traverse ring 14 becomes swingable about the pivot formed by the pin 18, which is supported in the ball bearing 19 and held in position by the connecting rod 15, which is locked by the liquid in the cylinder 54. The result of this swing motion of the traverse is the same as that of a swing motion caused by operation of the hydraulic drive, except that the adjustment is effected at a considerably higher speed. If a kind of wabbling motion of the traverse 14 or of the slidable sleeve 10 is caused owing to the forces acting during the flight, the traverse member or the sleeve owing to the provision of the ball bearings 19 and 24 may freely yield to such forces so that jamming and consequent high wear are avoided.

Any possible edgewise pressing which might still occur is held within admissible limits by provision of the bushing 8 of artificial resin.

Figure 6:
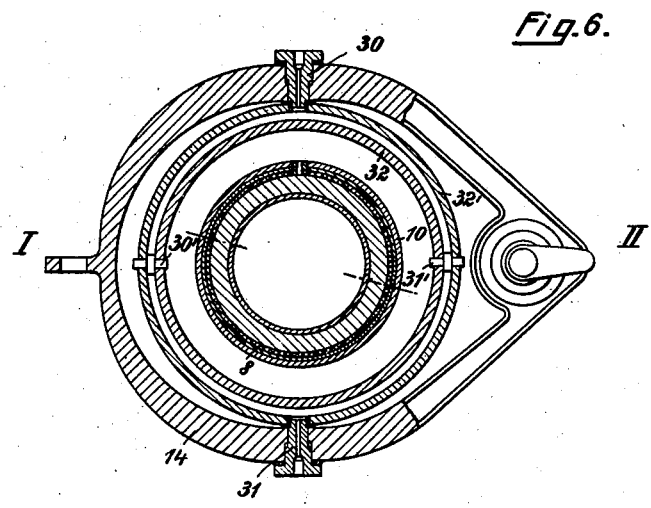
Fig. 6 is a cross section similar to Fig. 5, showing a modification wherein the sleeve setting lever is connected to the sleeve by a Cardan arrangement.

A modified arrangement for permitting Cardan-motion of the parts is illustrated in Fig. 6. In this arrangement, the traverse ring 14 is connected Cardan-fashion with the slidable sleeve 10 or with the holder ring 32 of the ball bearing 33 on this sleeve by means of a further ring 32' which is swingable about the trunnions 30 and 31, while the holder ring 32 in turn is swingable perpendicularly thereto about the trunnions 30' and 31' of the ring 32'.

The present invention has been described in detail with reference to specific embodiments. It is to be understood, however, that the invention is not limited by such specific reference but is broader in scope and capable of other embodiments than those specifically described and illustrated in the drawings.

We claim:

1. In an adjusting system for the propeller blades of a variable pitch propeller provided with an automatic speed regulator and a manual control lever the combination of, a propeller shaft, a sleeve slidably mounted on said propeller shaft, means operatively connecting said sleeve with said propeller blades and adapted to transform sliding motion of said sleeve into turning motion of said propeller blades, a two-armed lever operatively engaging said sleeve, a first source of power adapted to act upon one end of said lever in either direction of adjustment at low adjusting speed, said first source of power being subject to control by said automatic speed regulator, a second source of power adapted to act upon another end of said lever in either direction of adjustment separately from said first source of power and at an adjusting speed which is a multiple of the adjusting speed produced by said first source of power, and said second source of power being subject to control by said manual control lever.

2. In an adjusting system for the propeller blades of a variable pitch propeller provided with an automatic speed regulator and a manual control lever the combination of, a propeller shaft, a sleeve slidably mounted on said propeller shaft, means operatively connecting said sleeve with said propeller blades and adapted to transform sliding motion of said sleeve into turning motion of said propeller blades, a two-armed lever operatively engaging said sleeve, first driving means for said lever engaging one end thereof including an electric motor subject to control of said automatic speed regulator and a high ratio reduction gear, and second driving means for said lever engaging another end thereof including an electric motor subject to control of said manual control lever.

3. In an adjusting mechanism for the propeller blades of a variable pitch propeller provided with an automatic speed regulator and a manual control lever the combination of, a propeller shaft, a sleeve slidably mounted on said propeller shaft, means operatively connecting said sleeve with said propeller blades and adapted to transform sliding motion of said sleeve into turning movement of said propeller blades, a two-armed lever operatively engaging said sleeve, first driving means for said lever engaging one end thereof including a hydraulic actuated piston subject to control of said automatic speed regulator, and second driving means for said lever engaging another end thereof including an electric motor subject to control of said manual control lever.

4. In an adjusting system for the propeller blades of a variable pitch propeller provided with an automatic speed regulator and a manual control lever the combination of, a propeller shaft, a sleeve slidably mounted on said propeller shaft, means operatively connecting said sleeve with said propeller blades and adapted to transform sliding motion of said sleeve into turning movement of said propeller blades, a two-armed lever operatively engaging said sleeve, Cardan joints at both ends of said lever, a first source of mechanical power adapted to act upon one of said Cardan joints in either direction of adjustment at low adjusting speed, said first source of mechanical power being subject to control by said automatic speed regulator, a second source of mechanical power adapted to act upon the other of said Cardan joints in either direction of adjustment separately from said first source of mechanical power and at an adjusting speed which is a multiple of the adjusting speed produced by said first source of mechanical power, and said second source of mechanical power being subject to control by said manual control lever.

5. In an adjusting system for the propeller blades of a variable pitch propeller provided with an automatic speed regulator and a manual control lever the combination of, a propeller shaft, a sleeve slidably mounted on said propeller shaft, means operatively connecting said sleeve with said propeller blades and adapted to transform sliding motion of said sleeve into turning movement of said propeller blades, a two-armed lever operatively engaging said sleeve, a gimbal mounting between said sleeve and said lever, a first source of mechanical power adapted to act upon one end of said lever in either direction of adjustment at low adjusting speed, said first source of mechanical power being subject to control by said automatic speed regulator, a second source of mechanical power adapted to act upon another end of said lever in either direction of adjustment separately from said first source of mechanical power and at an adjusting speed which is a multiple of the adjusting speed produced by said first source of mechanical power, and said second source of mechanical power being subject to control by said manual control lever.

6. In an adjusting system for the propeller blades of a variable pitch propeller provided with an automatic speed regulator and a manual control lever the combination of, a propeller shaft, a bushing of non-metallic material mounted on said propeller shaft, a sleeve adapted to slide upon said bushing, means operatively connecting said sleeve with said propeller blades and adapted to transform sliding motion of said sleeve into turning movement of said propeller blades, a two-armed lever operatively engaging said sleeve, a first source of mechanical power adapted to act upon one end of said lever in either direction of adjustment at low adjusting speed, said first source of mechanical power being subject to control by said automatic speed regulator, a second source of mechanical power adapted to act upon another end of said lever in either direction of adjustment separately from said first source of mechanical power and at an adjusting speed which is a multiple of the adjusting speed produced by said first source of mechanical power, and said second source of mechanical power being subject to control by said manual control lever.

7. In an adjusting system for the propeller blades of a variable pitch propeller provided with an automatic speed regulator and a manual control lever the combination of, a propeller shaft, a sleeve slidably mounted around said propeller shaft, a bushing of non-metallic material of the phenol-aldehyde resin type mounted within said sleeve, means operatively connecting said sleeve with said propeller blades and adapted to transform sliding motion of said sleeve into turning movement of said propeller blades, a two-armed lever operatively engaging said sleeve, a first source of mechanical power adapted to act upon one end of said lever in either direction of adjustment at low adjusting speed, said first source of mechanical power being subject to control by said automatic speed regulator, a second source of mechanical power adapted to act upon another end of said lever in either direction of adjustment separately from said first source of mechanical power and at an adjusting speed which is a multiple of the adjusting speed produced by said first source of mechanical power, and said second source of mechanical power being subject to control by said manual control lever.

ROBERT PRAUSE.
LUKAS SCHMID.